May 30, 1933.  A. L. FREEDLANDER  1,911,497
PROCESS OF MANUFACTURING A WRAPPED BELT
Filed July 13, 1931    3 Sheets-Sheet 1
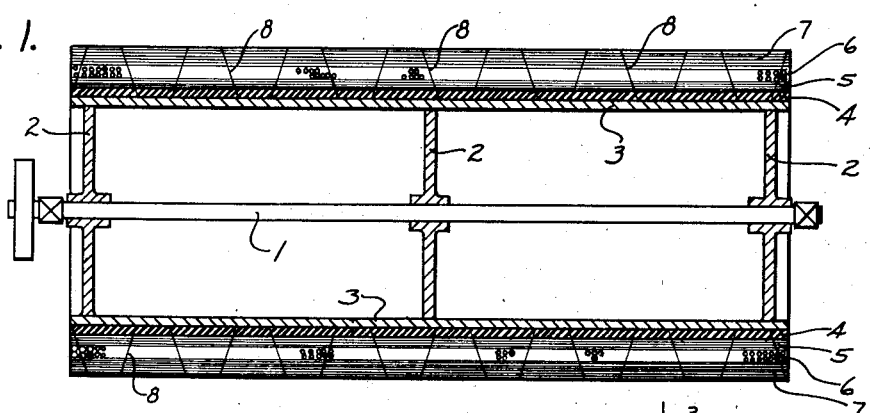
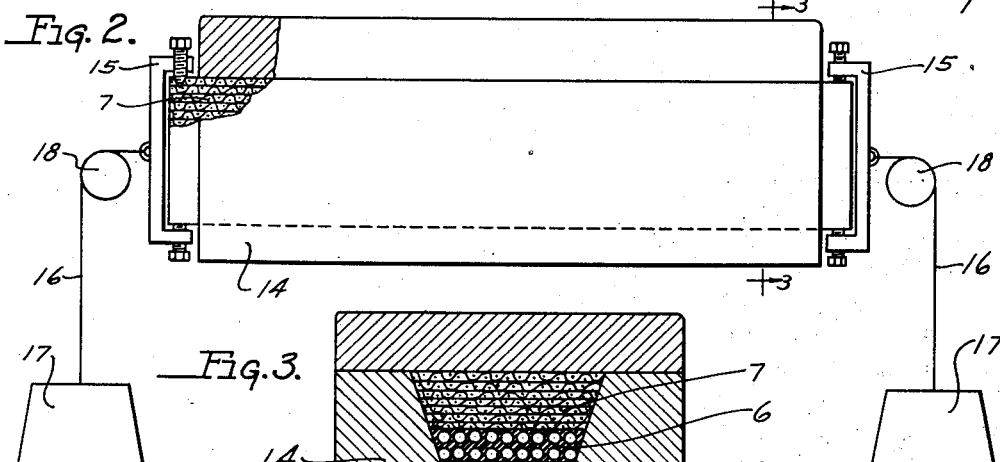
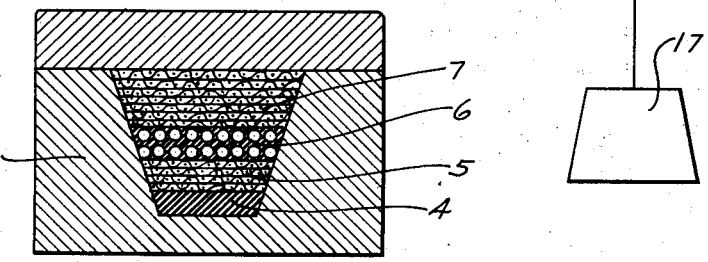
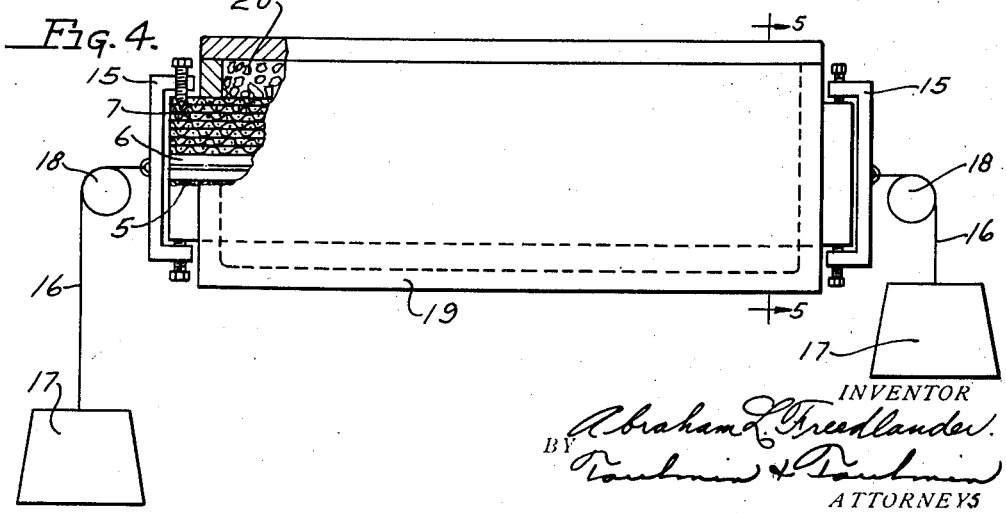
INVENTOR
Abraham L. Freedlander
BY Toulmin & Toulmin
ATTORNEYS May 30, 1933.  A. L. FREEDLANDER  1,911,497
PROCESS OF MANUFACTURING A WRAPPED BELT
Filed July 13, 1931  3 Sheets-Sheet 2

INVENTOR
Abraham L. Freedlander
BY
ATTORNEYS

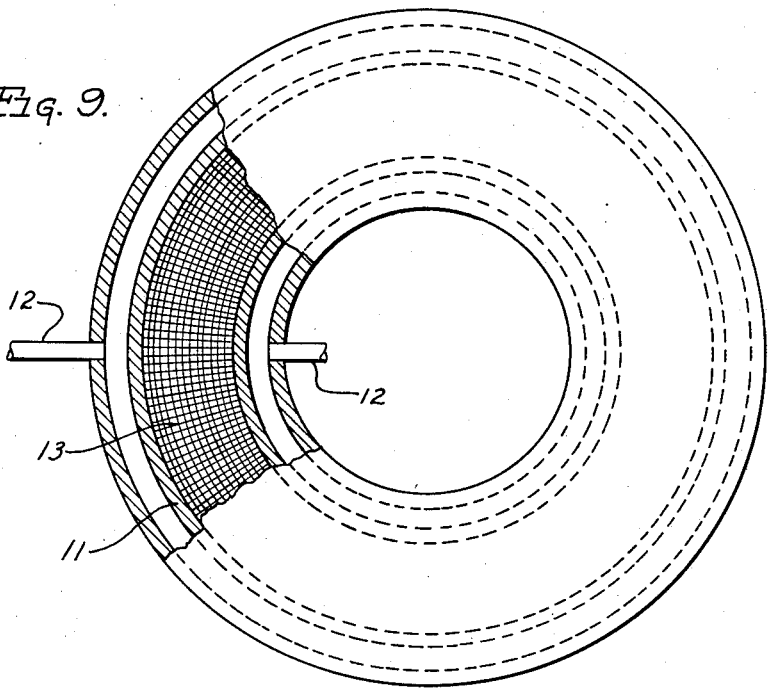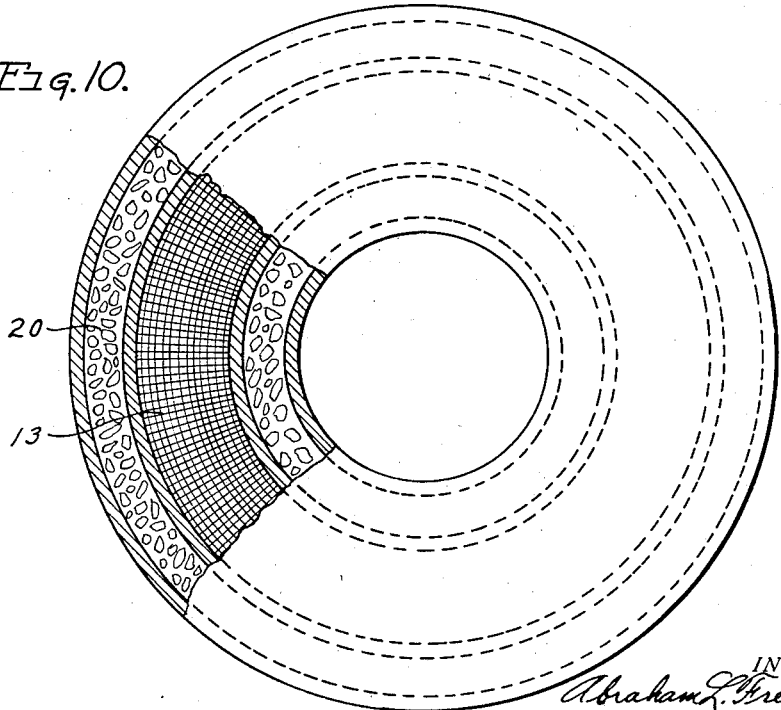

Patented May 30, 1933

1,911,497

UNITED STATES PATENT OFFICE

ABRAHAM L. FREEDLANDER, OF DAYTON, OHIO

PROCESS OF MANUFACTURING A WRAPPED BELT

Application filed July 13, 1931. Serial No. 550,479.

My invention relates to the manufacture of belts.

It is particularly my object to provide a method of manufacturing belts which are made out of extensible materials, of which typical examples are textile materials and rubber and the combination of textile materials and rubber, although my method is adaptable to making belts of any type of belt materials which are subject to stretching.

In particular it is my object to fix, by freezing or equivalent means, the belt while it is unvulcanized in its prestretched condition, (or to stretch it after having been formed in its unvulcanized form); and then to wrap the belt while in its stretched, frozen form, whereupon, while still frozen and while still wrapped, if wrapped, it is placed in a mold and vulcanized.

It is my object to provide such a process and apparatus to produce this result whether an endless belt or a belt with ends is employed.

Referring to the drawings:

Figure 1 is a section through a mandrel or drum with the belt material wound upon the drum and severed into belt sections;

Figure 2 is a side elevation, partially in section, showing diagrammatically one form of a stretching mechanism when the belt is manufactured other than on a drum;

Figure 3 is a section on the line 3—3 thereof;

Figure 4 is a side elevation, partially in section, showing diagrammatically, the freezing of the belt when the form of stretching mechanism is used as in Figures 2 and 3;

Figure 9 is a side elevation, partially in section, of a circular mold in which the wrapped or unwrapped belt made according to Figures 1 and 8 is vulcanized while still frozen;

Figure 10 shows the belt with its wrapper after formation, being frozen prior to vulcanization.

Figure 5:
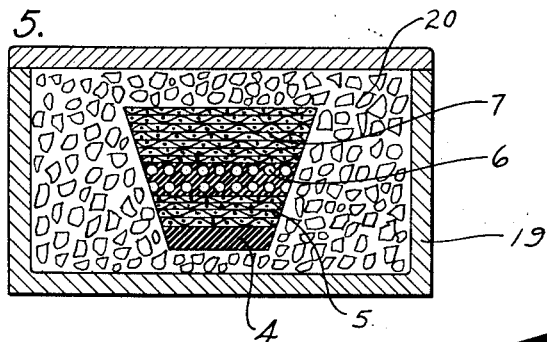
Figure 5 is a section on the line 5—5 of Figure 4.
Figure 6:
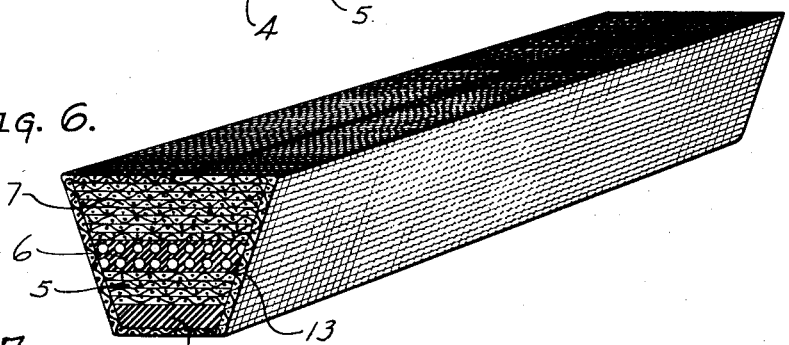
Figure 6 shows the composite belt, partially in section, with its wrapper applied after stretching and prior to freezing.
Figure 7:
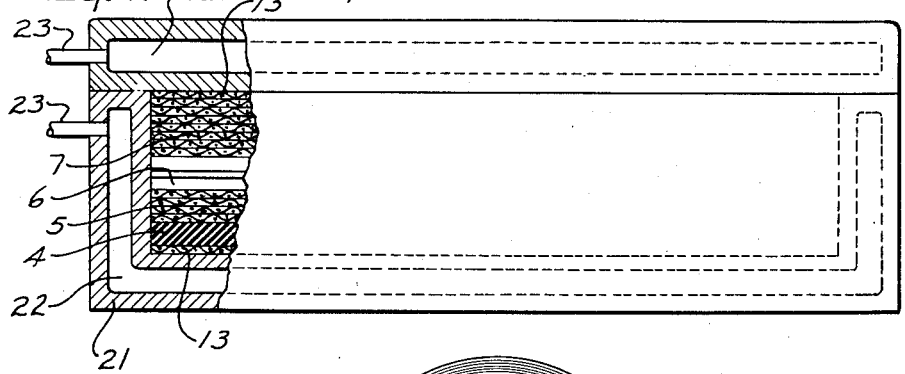
Figure 7 is a side elevation, partially in section, of the vulcanizing mold for the belt shown in Figure 6 in which it is vulcanized before it thaws.
Figure 8:
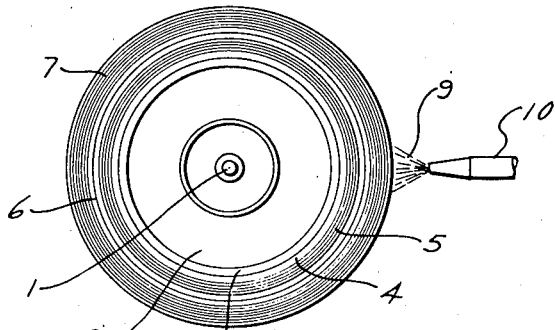
Figure 8 is a side elevation of Figure 1 showing the belt being frozen by spraying carbon dioxide thereon to freeze it in stretched condition while on the mandrel of Figure 1.

Referring to the drawings in detail, 1 represents an axle having the supports 2 for the mandrel or drum 3 on which is wound a plurality of layers of rubber fabric cords in any predetermined order of arrangement, such material being designated as rubber at 4, concentric layers of rubberized fabric as 5, rubber embedded cords as 6, and additional layers of rubberized fabric at 7.

It will be understood that my invention is not limited to any particular type of materials or arrangement, as my method is applicable to any type of belt which is formed of materials that are initially resilient and must be prestretched to form them in the predetermined length and transverse dimensions desired.

When the material is in the form shown in Figure 1, it is then cut into belt form as desired. If V-belts are desired, the belt material is severed along the diagonal lines as at 8. When this step has been performed or before the cutting step has been performed, I then freeze the belt by either embedding the entire drum in solid carbon dioxide, or other refrigerant, or spraying upon the surface of the drum as it rotates a carbon dioxide spray 9 from the nozzle 10, which impinges upon the surface of the belt material as a snow quickly freezing the belt material. The belt material, when so frozen, is then in its prestretched condition and can be removed and inserted in the mold shown in Figure 9 at 11, to which steam is applied through the pipes 12 for vulcanization where it is vulcanized. If desired, it may be wrapped with a suitable rubber 13 and then placed in the mold and vulcanized.

While the wrapping steps and the vulcanization steps take place, while the belt is still frozen and maintained in its stretched condition, it does not have any opportunity to take up the stretch before it is vulcanized in its stretched frozen condition and, after being vulcanized, it, of course, remains in its stretched condition as it then takes a fixed form.

In the event that it is desired to cover the material from the drum in end-belt form or to build up the material in another manner so that the belt has ends, such a strip of material may be mounted within a stretching mold, as in Figure 2, designated 14. Clamps 15 are applied to either end of the belt, which clamps are attached by cables 16 to weights 17. The cables pass over the pulleys 18. Then the stretched belt is immediately removed and placed within the freezing chamber 19 and frozen by a solid carbon dioxide 20. Thereafter, it is wrapped with the rubber 13 and then placed in the vulcanization mold 21 having steam chambers 22 connected to steam pipes 23. It is then vulcanized in this chamber with its wrapper before it can thaw and return to its initial unstretched condition. However, the belt may first be wrapped, stretched, frozen, and then vulcanized in the vulcanizing mold.

It will be understood that any type of materials may be employed in addition to rubber and textile materials. For instance, the same principles apply, as practiced in my process, to belts made of balata or leather.

All materials in the nature of rubber and fabric, when subjected to various manufacturing operations are subject to a pulling or stretching, either purposely or unavoidably. After each successive operation, the material so stretched tends to come back or contract. Under my invention, belts may be built up completely, individually, and wrapped. They may then be stretched while in the wrapped condition and frozen before taken off of the stretcher.

By "freezing" I mean the reduction of the rubber and fabric to an inert condition where, when released from the stretching means, the material will not return towards its original dimensions or condition.

In practice I prefer carbon dioxide which reduces the temperature from 30 to 110 degrees below zero because it is harmless to rubber and it is so quick in its operation that the manufacturing operations of making the belt are not appreciably slowed down.

It will be understood that I comprehend within my invention the freezing of the neutral axis backbone of cords in the belt, such as the cords 6, and the rapid building of the remainder of the material of the belt thereon and then the vulcanization of the belt before its neutral axis portion can thaw and contract.

Customarily I freeze the entire belt as a matter of convenience, but either way is a satisfactory method of making a belt.

It will be understood that I desire to comprehend within my invention such modifications as may be necessary to adapt it to varying conditions and uses.

Having thus fully described my invention, what I claim as new and desire to secure by Letters Patent, is:

1. In a method of manufacturing a belt, forming a rubber fabric belt on a support, stretching the belt while it is so formed, freezing it while stretched, wrapping it while still frozen, and vulcanizing it with the wrapper on it, the vulcanizing act beginning while the belt is frozen.

2. In a method of forming a belt, winding rubber fabric belt materials on a form and stretching them, freezing the material composing the belt in its stretched form, removing the belt, wrapping it while still frozen and vulcanizing it by beginning the vulcanizing while the belt is still frozen with the wrapper on it.

3. In a method of forming a belt, forming the belt of composite rubber fabric materials, molding it to the cross section desired, stretching it while so molded, wrapping it before the stretch disappears from the belt, and freezing the wrapped belt in its molded stretched condition.

4. In a method of forming a belt, winding composite layers of rubber and fabric in stretched condition on a drum, freezing the belt material on the drum, severing the material into belts while frozen, removing from the drum, wrapping the material with a fabric wrapper while still frozen to form independent wrapped belts, and vulcanizing the wrapped frozen belt by beginning the vulcanizing act while the belt is frozen.

5. In a method of manufacturing a belt, forming a rubberized belt, wrapping the belt, stretching the wrapped belt, freezing it while so stretched and then vulcanizing it by applying vulcanizing heat to the belt while it is still in its frozen condition.

6. In a method of manufacturing a belt, forming a rubberized belt, wrapping it, freezing it while wrapped, and vulcanizing the belt by applying the vulcanizing process to it while it is frozen.

7. In a method of forming a belt, forming a rubberized belt in stretched condition, wrapping it while stretched, freezing it in its stretched wrapped condition prior to the reduction of the stretch in it, and vulcanizing the belt by applying the vulcanizing process to it while it is still frozen.

8. In a method of manufacturing a rubber fabric belt, molding a belt to a predetermined cross section, stretching it to a predetermined length, wrapping it while so molded and stretched, freezing it while in its molded and stretched condition and vulcanizing the belt by applying the vulcanizing process to it while it is still frozen.

In testimony whereof, I affix my signature.

ABRAHAM L. FREEDLANDER.